(12) United States Patent
Landry et al.

(10) Patent No.: US 12,384,475 B2
(45) Date of Patent: Aug. 12, 2025

(54) WHEEL ASSEMBLY FOR TRACK SYSTEM, WHEEL ASSEMBLY FOR TRACK SYSTEM OF LIGHT-HEAVY DUTY VEHICLE AND TRACK SYSTEM FOR LIGHT-HEAVY DUTY VEHICLE

(71) Applicant: SOUCY INTERNATIONAL INC., Drummondville (CA)

(72) Inventors: Gabriel Landry, Sainte-Madeleine (CA); Yves Sauvageau, Drummondville (CA); Gregory Wright, Inverness (CA); Branislav Nanac, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 581 days.

(21) Appl. No.: 17/851,156

(22) Filed: Jun. 28, 2022

(65) Prior Publication Data

US 2022/0410989 A1 Dec. 29, 2022

Related U.S. Application Data

(60) Provisional application No. 63/216,081, filed on Jun. 29, 2021.

(51) Int. Cl.
*B62D 55/14* (2006.01)
*B62D 55/06* (2006.01)
(Continued)

(52) U.S. Cl.
CPC ............. *B62D 55/14* (2013.01); *B62D 55/06* (2013.01); *B62D 55/088* (2013.01); *B62D 55/10* (2013.01); *B62D 55/125* (2013.01); *B62D 55/244* (2013.01)

(58) Field of Classification Search
CPC ...... B62D 55/14; B62D 55/06; B62D 55/088; B62D 55/10; B62D 55/125; B62D 55/244
See application file for complete search history.

(56) References Cited

U.S. PATENT DOCUMENTS 4,640,559 A 2/1987 Crotti
5,373,909 A * 12/1994 Dow .................. B62D 55/0655
180/9.1
(Continued)

FOREIGN PATENT DOCUMENTS

CN 211167157 U 8/2020

OTHER PUBLICATIONS

Pitsco, Tetrix® Max Tank Tread Rubber Insert, Retrieved on May 10, 2020: https://www.pitsco.com/TETRIX-Tank-Tread-Rubber-Inserts.
(Continued)

*Primary Examiner* — Jacob B Meyer
(74) *Attorney, Agent, or Firm* — BCF LLP

(57) ABSTRACT

A wheel assembly for a track system of a light heavy-duty vehicle is disclosed. The track system has a frame and an elastomeric endless track. The wheel assembly includes a wheel, an axle and first and second bearings. The wheel defines a wheel cavity in which the axle is receivable. The first and second bearing assemblies are disposed in the wheel cavity. The first bearing assembly is at a first end portion of the axle, and the second bearing assembly is at the second end portion of the axle. The wheel assembly is removable connectable to the frame of the track system. A track system and a light heavy-duty vehicle are also disclosed.

18 Claims, 6 Drawing Sheets

(51) Int. Cl.
    *B62D 55/088*     (2006.01)
    *B62D 55/10*     (2006.01)
    *B62D 55/125*     (2006.01)
    *B62D 55/24*     (2006.01)

(56) References Cited

U.S. PATENT DOCUMENTS

| | | |
|---|---|---|
| 6,006,847 A | 12/1999 | Knight |
| 6,318,483 B1 | 11/2001 | Garrett et al. |
| 6,482,053 B1 | 11/2002 | Prestenbach |
| 6,712,549 B2 | 3/2004 | Roth |
| 6,733,093 B2 | 5/2004 | Deland et al. |
| 7,370,865 B2 | 5/2008 | Vik et al. |
| 8,240,782 B2 * | 8/2012 | Bessette ............... B62D 55/125 305/131 |
| 8,430,188 B2 | 4/2013 | Hansen |
| 10,940,902 B2 * | 3/2021 | Marchildon ........... B62D 55/04 |
| 2020/0189671 A1 | 6/2020 | Lussier et al. |
| 2022/0135153 A1 * | 5/2022 | Couture ............... B62D 55/065 305/155 |
| 2022/0219769 A1 * | 7/2022 | Aubin-Marchand .. B62D 55/04 |
| 2022/0410989 A1 * | 12/2022 | Landry ................ B62D 55/125 |
| 2023/0312030 A1 * | 10/2023 | Bair .................. B62D 55/0887 305/117 |
| 2024/0158027 A1 * | 5/2024 | Landry .................. B62D 55/14 |

OTHER PUBLICATIONS

English abstract of CN 211167157 retrieved from Espacenet on May 10, 2022.

\* cited by examiner

WHEEL ASSEMBLY FOR TRACK SYSTEM, WHEEL ASSEMBLY FOR TRACK SYSTEM OF LIGHT-HEAVY DUTY VEHICLE AND TRACK SYSTEM FOR LIGHT-HEAVY DUTY VEHICLE

CROSS-REFERENCE TO RELATED APPLICATION

The present application claims priority to U.S. Provisional Patent Application No. 63/216,081, filed Jun. 29, 2021 entitled "Wheel Assembly for Track System, Wheel Assembly for Track System of Light-Heavy Duty Vehicle and Track System for Light-Heavy Duty Vehicle", which is incorporated by reference herein in its entirety.

TECHNICAL FIELD

The present technology relates to wheel assemblies for track systems, wheel assemblies for track systems of light-heavy duty vehicles, track systems for light heavy-duty vehicles, and light-heavy duty vehicles having the track systems and the wheel assemblies.

BACKGROUND

Certain vehicles, such as, for example, agricultural vehicles (e.g., harvesters, combines, tractors, etc.) and construction vehicles (e.g., bulldozers, front-end loaders, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces, and as these vehicles are generally heavy, the tires may compact the ground surface in an undesirable way owing to the weight of the vehicle.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable construction vehicles to be used in wet field conditions as opposed to its wheeled counterpart.

Conventional track systems, especially those used with light and medium duty vehicles, do, however, present some inconveniences. Such vehicles are typically equipped with track systems having a metallic track made of linked metallic segments or an elastomeric track with embedded reinforcing members typically made of steel. Such tracks can have low operational top speeds, can be noisy, can have high vibration and can have a low ride quality.

In addition, conventional track systems are equipped with track wheels that are connected to axles by bushings. This can also contribute to low operational speeds, can be noisy, can have high vibration and can have a low ride quality.

Therefore, there is a desire for a track system and wheel assemblies that could mitigate at least some of the above-mentioned issues.

SUMMARY

It is therefore an object of the present technology to ameliorate the situation with respect to at least one of the inconveniences present in the prior art.

It is also an object of the present technology to provide an improved track system and support wheel assemblies at least in some instances as compared with some of the prior art.

The present technology relates to wheel assemblies removably connectable to a track system. The wheel assembly has a wheel that defines a cavity in which an axle can be received. Bearings rotationally connect the axle to the wheel.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Also, the term "wheel assemblies" include all the necessary structure (bearing structures, pins, axles and other components) to permit a structure/wheel to pivot/rotate about an axis, as the case may be.

According to an aspect of the present technology, there is provided a wheel, an axle and first and second bearing assemblies. The wheel defines a wheel cavity. The axle is receivable in the wheel cavity, and has a first end portion and a second end portion. The first and second bearing assemblies are configured to rotationally connect the axle to the wheel. The first bearing assembly is disposed in the wheel cavity proximate to the first end portion of the axle, and the second bearing assembly is disposed in the wheel cavity proximate to the second end portion of the axle. The wheel assembly is removably connectable to the frame of the track system.

In some embodiments, the wheel has a first side and a second side opposite to the first side, and a portion of the first end portion of the axle extends from the first side of the wheel and a portion of the second end portion of the axle extends from the second side of the wheel.

In some embodiments, the wheel assembly further includes a first seal and a second seal. The first seal is disposed in the wheel cavity, outwardly to the first bearing assembly and in contact with the wheel and the axle, the first seal is configured to seal one side of the wheel cavity. The second seal is disposed in the wheel cavity, outwardly to the second bearing assembly and in contact with the wheel and the axle, the second seal is configured to seal another side of the wheel cavity.

In some embodiments, the first bearing assembly includes a first seal integrated to the first bearing assembly and the second bearing assembly includes a second seal integrated to the second bearing assembly.

In some embodiments, the wheel assembly further includes a first fastener connectable to the first end portion of the axle and a second fastener connectable to the second end portion of the axle, the first and second fasteners removably connecting the wheel assembly to the frame of the track system.

In some embodiments, the first and second bearing assemblies are connected to the axle by one of an interference fit, a clearance fit, and a transition fit.

In some embodiments, the wheel assembly further includes a first retaining ring connected to the axle proximate to the first end portion, and a second retaining ring connected to the axle proximate to the second end portion.

In some embodiments, the wheel assembly includes the first and second seals, and a laterally inward portion of the first seal contacts a laterally outward portion of the first retaining ring, and a laterally inward portion of the second seal contacts a laterally outward portion of the second retaining ring.

In some embodiments, a laterally inward portion of the first retaining ring contacts a laterally outward portion of the first bearing assembly, and a laterally inward portion of the second retaining ring contacts a laterally outward portion of the second bearing assembly.

In some embodiments, the wheel cavity has an inner cylindrical wall and the first and second bearing assemblies are connected to the inner cylindrical wall by one of an interference fit, a clearance fit, and a transition fit.

In some embodiments, each of the first and second bearing assemblies includes a tapered roller bearing.

In some embodiments, the wheel has a first track-engaging portion, a second track-engaging portion, and a central portion defined between the first and second track engaging portions.

In some embodiments, the elastomeric track is a polymeric elastomeric track.

In some embodiments, the elastomeric track is laterally deformable.

In some embodiments, the elastomeric track is laterally deformable along an entire width of the elastomeric track.

In some embodiments, wherein the elastomeric track is longitudinally reinforced.

In some embodiments, the elastomeric track is longitudinally reinforced with longitudinal reinforcing members.

In some embodiments, the longitudinally reinforced elastomeric track is non-reinforced laterally.

In some embodiments, the light heavy-duty vehicle is one of a compact track loader and tracked skid-steer.

In some embodiments, the wheel assembly is at least one of a support wheel assembly and an idler wheel assembly.

In another aspect of the present technology, there is provided a track system operatively connectable to a light heavy-duty vehicle. The track system includes a frame, a sprocket wheel assembly, at least one idler wheel assembly, at least one support wheel assembly and an elastomeric endless track. The sprocket wheel assembly and the at least one idler wheel assembly are rotationally connected to the frame. The at least one support wheel assembly is removably connected to the frame. The at least one support wheel assembly includes a wheel defining a wheel cavity, an axle and first and second bearing assemblies. The axle is receivable in the wheel cavity, and has a first end portion and a second end portion. The first and second bearing assemblies are configured to rotationally connect the axle to the wheel. The first bearing assembly is disposed in the wheel cavity proximate to the first end portion of the axle, and the second bearing assembly is disposed in the wheel cavity proximate to the second end portion of the axle. The elastomeric endless track surrounds the frame, the sprocket wheel assembly, the idler wheel assembly and the at least one support wheel assembly.

In some embodiments, the wheel has a first side and a second side opposite to the first side, and a portion of the first end portion of the axle extends from the first side of the wheel and a portion of the second end portion of the axle extends from the second side of the wheel.

In some embodiments, the at least one support wheel assembly further includes a first seal and a second seal. The first seal is disposed in the wheel cavity, outwardly to the first bearing assembly and in contact with the wheel and the axle, the first seal is configured to seal one side of the wheel cavity. The second seal is disposed in the wheel cavity, outwardly to the second bearing assembly and in contact with the wheel and the axle, the second seal is configured to seal another side of the wheel cavity.

In some embodiments, the first bearing assembly includes a first seal integrated to the first bearing assembly and the second bearing assembly includes a second seal integrated to the second bearing assembly.

In some embodiments, the at least one support wheel assembly further includes a first fastener connectable to the first end portion of the axle and a second fastener connectable to the second end portion of the axle, the first and second fasteners removably connecting the wheel assembly to the frame of the track system.

In some embodiments, the first and second bearing assemblies are connected to the axle by one of an interference fit, a clearance fit, and a transition fit.

In some embodiments, the wheel assembly further includes a first retaining ring connected to the axle proximate to the first end portion, and a second retaining ring connected to the axle proximate to the second end portion.

In some embodiments, the wheel assembly includes the first and second seals, and a laterally inward portion of the first seal contacts a laterally outward portion of the first retaining ring, and a laterally inward portion of the second seal contacts a laterally outward portion of the second retaining ring.

In some embodiments, a laterally inward portion of the first retaining ring contacts a laterally outward portion of the first bearing assembly, and a laterally inward portion of the second retaining ring contacts a laterally outward portion of the second bearing assembly.

In some embodiments, the wheel cavity has an inner cylindrical wall and the first and second bearing assemblies are connected to the inner cylindrical wall by one of an interference fit, a clearance fit, and a transition fit.

In some embodiments, each of the first and second bearing assemblies includes a tapered roller bearing.

In some embodiments, the wheel has a first track-engaging portion, a second track-engaging portion, and a central portion defined between the first and second track engaging portions.

In some embodiments, the elastomeric track is a polymeric elastomeric track.

In some embodiments, the elastomeric track is laterally deformable.

In some embodiments, the elastomeric track is laterally deformable along an entire width of the elastomeric track.

In some embodiments, wherein the elastomeric track is longitudinally reinforced.

In some embodiments, the elastomeric track is longitudinally reinforced with longitudinal reinforcing members.

In some embodiments, the longitudinally reinforced elastomeric track is non-reinforced laterally.

In some embodiments, the support wheel assembly is an idler wheel assembly.

In some embodiments, the at least one idler wheel assembly includes a wheel, an axle and first and second bearing assemblies. The wheel defines a wheel cavity. The axle is receivable in the wheel cavity, and has a first end portion and a second end portion. The first and second bearing assemblies rotationally connect the axle to the wheel. The first bearing assembly is disposed in the wheel cavity proximate to the first end portion of the axle, and the second bearing assembly being disposed in the wheel cavity proximate to the second end portion of the axle.

In another aspect of the present technology, there is provided a light heavy-duty vehicle. The light heavy-duty vehicle includes at least two axles and at least two track systems. Each one of the at least two track systems is operatively connected to one of the at least two axles. Each of the at least two track systems has a frame, a sprocket wheel assembly, at least one idler wheel assembly, at least one support wheel assembly and an elastomeric endless track. The sprocket wheel assembly is rotationally connected to the frame. The at least one idler wheel assembly is rotationally connected to the frame. The at least one support wheel assembly is removably connected to the frame. The at least one support wheel assembly has a wheel, an axle and first and second bearing assemblies. The wheel defines a wheel cavity. The axle is receivable in the wheel cavity, and has a first end portion and a second end portion. The first and second bearing assemblies are configured to rotationally connect the axle to the wheel. The first bearing assembly is disposed in the wheel cavity proximate to the first end portion of the axle, and the second bearing assembly being disposed in the wheel cavity proximate to the second end portion of the axle. The elastomeric endless track surrounding the frame, the sprocket wheel assembly, the idler wheel assembly and the at least one support wheel assembly.

In some embodiments, the wheel has a first side and a second side opposite to the first side, and a portion of the first end portion of the axle extends from the first side of the wheel and a portion of the second end portion of the axle extends from the second side of the wheel.

In some embodiments, the at least one support wheel assembly further includes a first seal and a second seal. The first seal is disposed in the wheel cavity, outwardly to the first bearing assembly and in contact with the wheel and the axle, the first seal is configured to seal one side of the wheel cavity. The second seal is disposed in the wheel cavity, outwardly to the second bearing assembly and in contact with the wheel and the axle, the second seal is configured to seal another side of the wheel cavity.

In some embodiments, the first bearing assembly includes a first seal integrated to the first bearing assembly and the second bearing assembly includes a second seal integrated to the second bearing assembly.

In some embodiments, the at least one support wheel assembly further includes a first fastener connectable to the first end portion of the axle and a second fastener connectable to the second end portion of the axle, the first and second fasteners removably connecting the wheel assembly to the frame of the track system.

In some embodiments, the first and second bearing assemblies are connected to the axle by one of an interference fit, a clearance fit, and a transition fit.

In some embodiments, the wheel assembly further includes a first retaining ring connected to the axle proximate to the first end portion, and a second retaining ring connected to the axle proximate to the second end portion.

In some embodiments, the wheel assembly includes the first and second seals, and a laterally inward portion of the first seal contacts a laterally outward portion of the first retaining ring, and a laterally inward portion of the second seal contacts a laterally outward portion of the second retaining ring.

In some embodiments, a laterally inward portion of the first retaining ring contacts a laterally outward portion of the first bearing assembly, and a laterally inward portion of the second retaining ring contacts a laterally outward portion of the second bearing assembly.

In some embodiments, the wheel cavity has an inner cylindrical wall and the first and second bearing assemblies are connected to the inner cylindrical wall by one of an interference fit, a clearance fit, and a transition fit.

In some embodiments, each of the first and second bearing assemblies includes a tapered roller bearing.

In some embodiments, the wheel has a first track-engaging portion, a second track-engaging portion, and a central portion defined between the first and second track engaging portions.

In some embodiments, the elastomeric track is a polymeric elastomeric track.

In some embodiments, the elastomeric track is laterally deformable.

In some embodiments, the elastomeric track is laterally deformable along an entire width of the elastomeric track.

In some embodiments, wherein the elastomeric track is longitudinally reinforced.

In some embodiments, the elastomeric track is longitudinally reinforced with longitudinal reinforcing members.

In some embodiments, the longitudinally reinforced elastomeric track is non-reinforced laterally.

In some embodiments, the light heavy-duty vehicle is a compact track loader or a tracked skid-steer.

In some embodiments, the support wheel assembly is an idler wheel assembly.

In some embodiments, the at least one idler wheel assembly includes a wheel, an axle and first and second bearing assemblies. The wheel defines a wheel cavity. The axle is receivable in the wheel cavity, and has a first end portion and a second end portion. The first and second bearing assemblies rotationally connect the axle to the wheel. The first bearing assembly is disposed in the wheel cavity proximate to the first end portion of the axle, and the second bearing assembly being disposed in the wheel cavity proximate to the second end portion of the axle.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
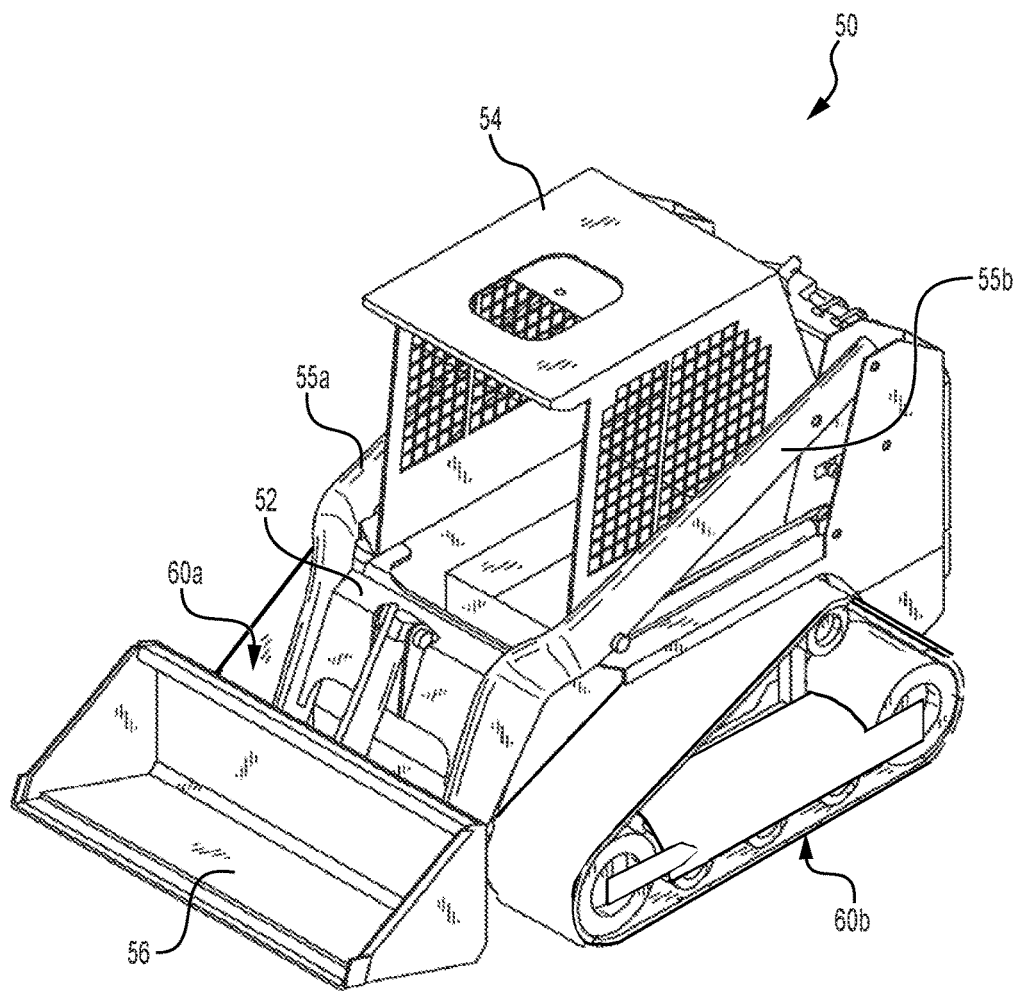
FIG. 1 is a perspective view taken from a top, front, left side of a compact track loader with track systems according to an embodiment of the present technology.

The present detailed description is intended to be a description of illustrative examples of the present technology. This description is not intended to define the scope or set forth the bounds of the present technology. In some cases, what are believed to be helpful examples of modifications or alternatives to apparatus may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the apparatus may provide in certain aspects a simple embodiment of the present technology, and that where such is the case it has been presented in this manner as an aid to understanding. As persons skilled in the art would understand, various embodiments of the present technology may be of a greater complexity than what is described herein.

As used herein, the singular form "a," "an" and "the" include plural referents unless the context clearly dictates otherwise.

The recitation herein of numerical ranges by endpoints is intended to include all numbers subsumed within that range (e.g., a recitation of 1 to 5 includes 1, 1.5, 2, 2.75, 3, 3.80, 4, 4.32, and 5).

The term "about" is used herein explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

The expression "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

As used herein, the term "comprise" is used in its non-limiting sense to mean that items following the word are included, but items not specifically mentioned are not excluded.

The present technology relates to a wheel assembly, which is removably connectable to a frame of a track system. The track system has a wheel, an axle and bearing assemblies rotationally connecting the axle to the wheel. The wheel assembly will be described with reference to a compact track loader. However, it is contemplated that the wheel assembly could be used with other types of light heavy-duty vehicle such as, but not limited to, tracked skid-steers, and mini excavators.

Referring to FIG. 1, an embodiment of the compact track loader 50 will be described. The compact track loader 50 has a body 52. A cab 54 extends upwardly from the body 52. The compact track loader 50 also has loader arms 55a, 55b pivotally and operationally connected to the body 52. A bucket 56 is connected at a front end of the loader arms 55a, 55b. Thus, when the loader arms 55a, 55b are operated, the bucket 56 can be moved. The compact track loader 50 also has a right track system 60a disposed on the right side of the body 52 (only partially shown in FIG. 1), and a left track system 60b disposed on the left side of the body 52. The left and right track systems 60a, 60b are operationally connected to the compact track loader 50. The compact track loader 50 is a light heavy-duty vehicle, such that the compact track loader 50 weighs approximately 10,000 lbs. It is contemplated that in other embodiments, the compact track loader 50 could weigh more or less than about 10,000 lbs. For instance, the compact track loader could weigh about 8,000 lbs, about 9,000 lbs, about 11,000 lbs or about 12,000 lbs. As mentioned above, it is understood that the compact track loader 50 could be other types of light heavy-duty vehicles.

Figure 2:
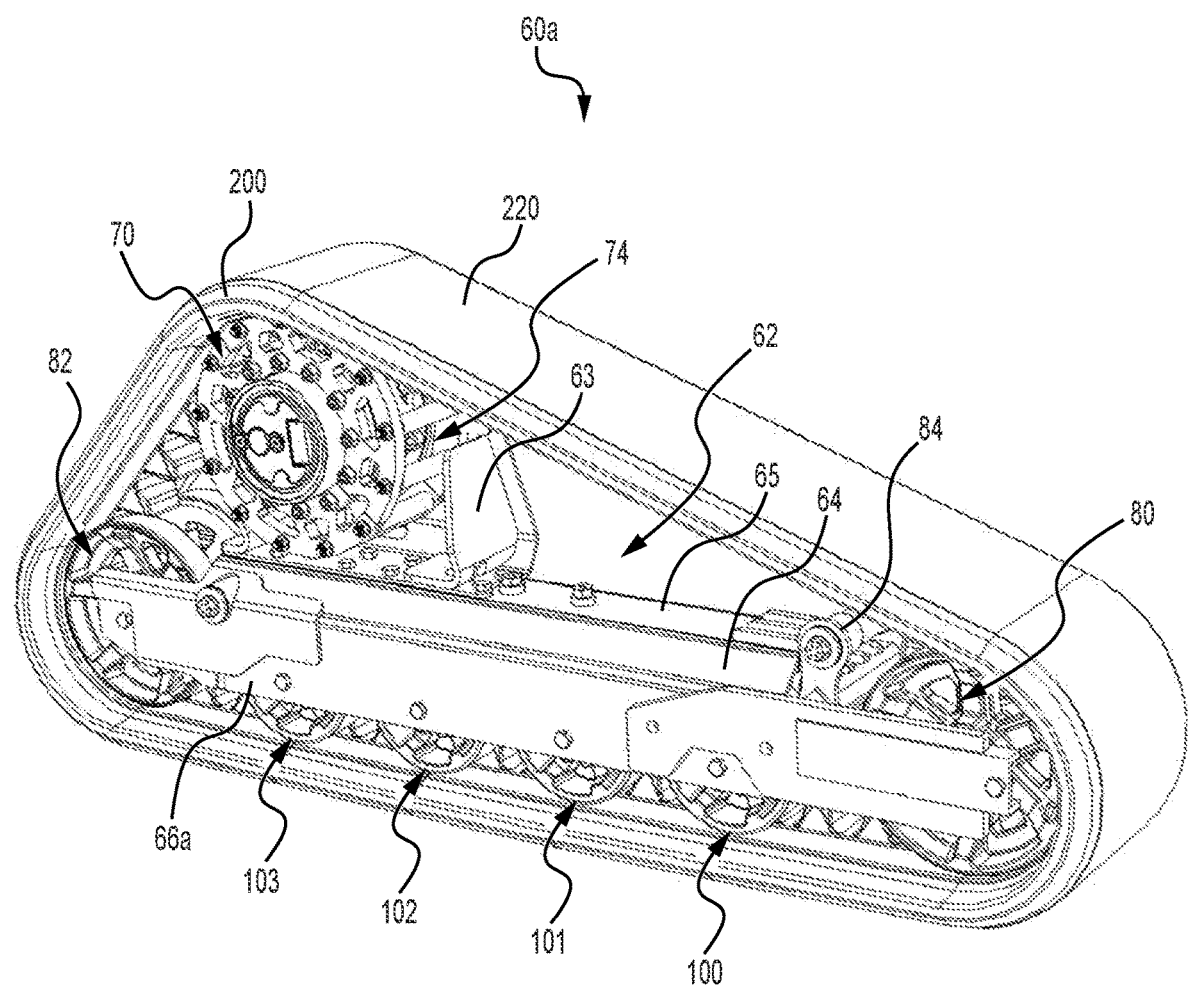
FIG. 2 is a perspective view taken from a top, front, right side of the track system of the compact track loader of FIG. 1.
Figure 3:
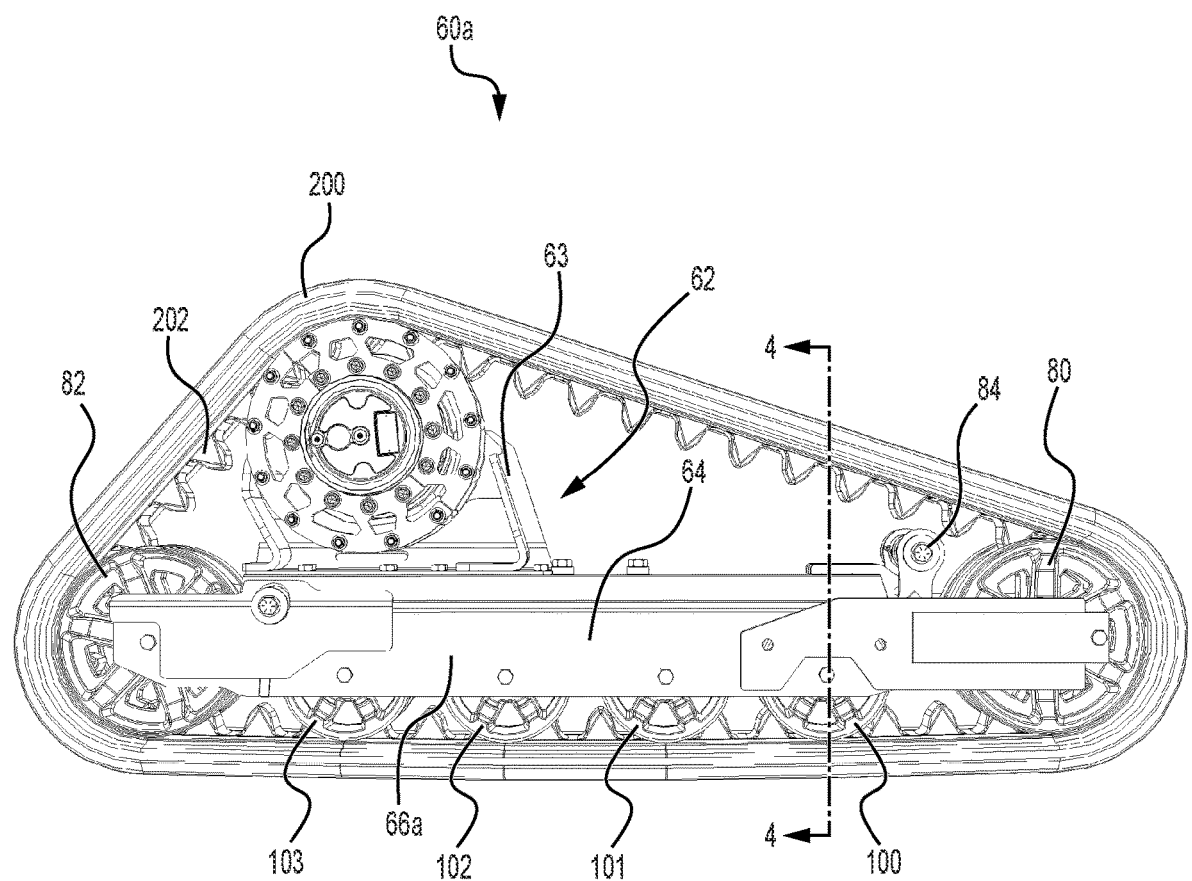
FIG. 3 is a right side elevation view of the track system of FIG. 2.
Figure 4:
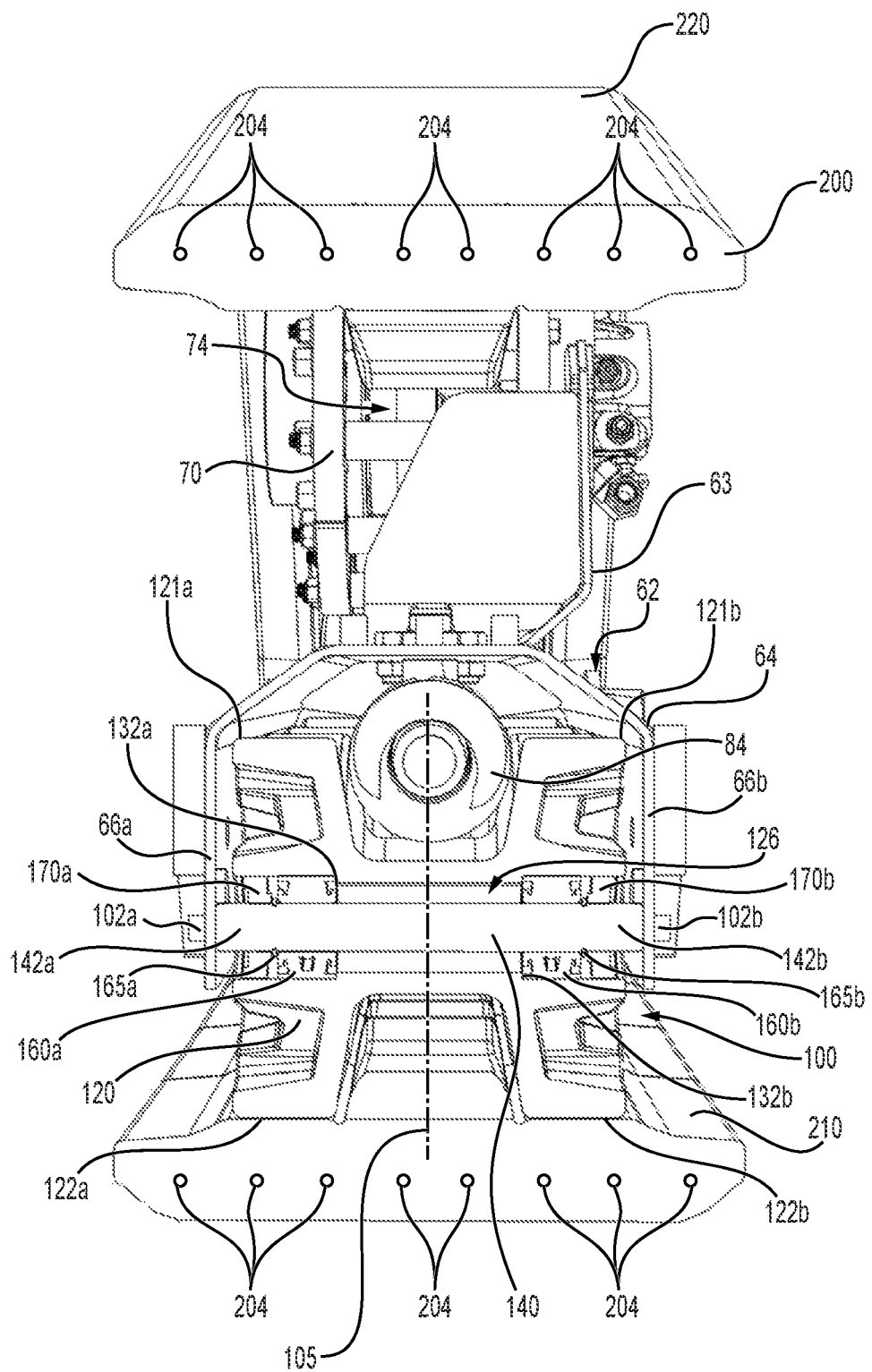
FIG. 4 is a cross-sectional view of the track system of FIG. 2 taken along the lines 4-4 of FIG. 3.

With reference to FIGS. 2 to 4, the left and right track systems 60a, 60b, which are generally symmetric, will now be described. As the track systems 60a, 60b are generally symmetric, only the right track system 60a will be described in detail.

The track system 60a has a frame 62 that has an upper frame section 63 and a lower frame section 64 that generally extends in the longitudinal direction. The lower frame section 64 has a top frame portion 65, a lateral frame portion 66a extending downwardly to the left from the top frame portion 65 and a lateral frame portion 66b extending downwardly to the right from the top frame portion 65.

The track system 60a also has a sprocket wheel assembly 70 that is rotationally connected to the frame 62. More precisely, the sprocket wheel assembly is rotationally connected to the upper frame section 63. The sprocket wheel assembly 70 is also operatively connected to a driving axle (not shown) of the compact track loader 50. The sprocket wheel assembly 70 defines recesses 74 that are longitudinally spaced on a circumference thereof. As will be described in greater detail below, the recesses 74 are configured to receive lugs 202 of an endless track 200.

The track system 60a has a front idler wheel assembly 80 and a rear idler wheel assembly 82, both of which are rotationally connected to the frame 62. More precisely, the front and rear idler wheel assemblies are rotationally and removably connected to the lower frame section 64. It is contemplated that in other embodiments, there could be more or less than two idler wheel assemblies. In the present embodiment, the front and rear idler wheel assemblies 80, 82 aid in distributing borne load to the ground, and as such are support wheel assemblies 80, 82. It is contemplated that in some embodiments, the front and rear idler wheel assemblies could not be support wheel assemblies. The track system 60a also includes a tensioner 84 operatively connected to the front idler wheel assembly 80. The tensioner 84 is operable to change the tension in the endless track 200 by moving the front idler wheel assembly 80. It is contemplated that in some embodiments, the tensioner 84 could be connected to the rear idler wheel assembly 82. It is also contemplated that in some embodiments, the tensioner 84 could be omitted. The front and rear idler wheel assemblies 80, 82 will be described in greater detail below.

The track system 60*a* also has four support wheel assemblies 100, 101, 102, 103 that are removably connected to the frame 62. More precisely, the four support wheel assemblies 100, 101, 102 103 are removably and rotationally connected to the lower frame section 64. It is contemplated that in some embodiments, there could be more or less than four support wheel assemblies. In the illustrated embodiment, the support wheel assemblies 100, 101, 102, 103 are disposed between the lateral frame portions 66*a*, 66*b*. The support wheel assemblies 100, 101, 102, 103 will be described in greater detail below.

The track system 60*a* also includes the endless track 200, which surrounds the frame 62, the sprocket wheel assembly 70, the front and rear idler wheel assemblies 80, 82 and the support wheel assemblies 100, 101, 102, 103. The endless track 200 is an elastomeric track. In the present embodiment, the endless track 200 is a polymeric track. The endless track 200 has an inner surface 210 and an outer surface 220.

The inner surface 210 of the endless track 200 has a set of lugs 202. The set of lugs 202 is positioned at a central portion of the inner surface 210. The lugs 202, which are longitudinally spaced, are configured to engage with the recesses 74 of the sprocket wheel assembly 70. The outer surface 220 of the endless track 200 has a tread (not shown) defined thereon. It is contemplated that the tread could vary from one embodiment to another. In some embodiments, the tread could depend on the type of ground surface on which the compact track loader 50 is destined to travel.

The endless track 200 is longitudinally reinforced. More precisely, the endless track is longitudinally reinforced with longitudinal reinforcing members 204. The longitudinal reinforcing members 204 are longitudinal cables 204. It is contemplated that the longitudinal reinforcing members 204 could be replaced with other forms of longitudinal reinforcing members without departing from the present technology.

The endless track 200 is laterally deformable. In the present embodiment, the endless track 200 is laterally deformable along an entire width of the endless track 200. Thus, the endless track 200 is non-reinforced laterally. In some embodiments, the endless track 200 could have reinforcing members that span a portion of the width of the endless track 200.

Figure 5:
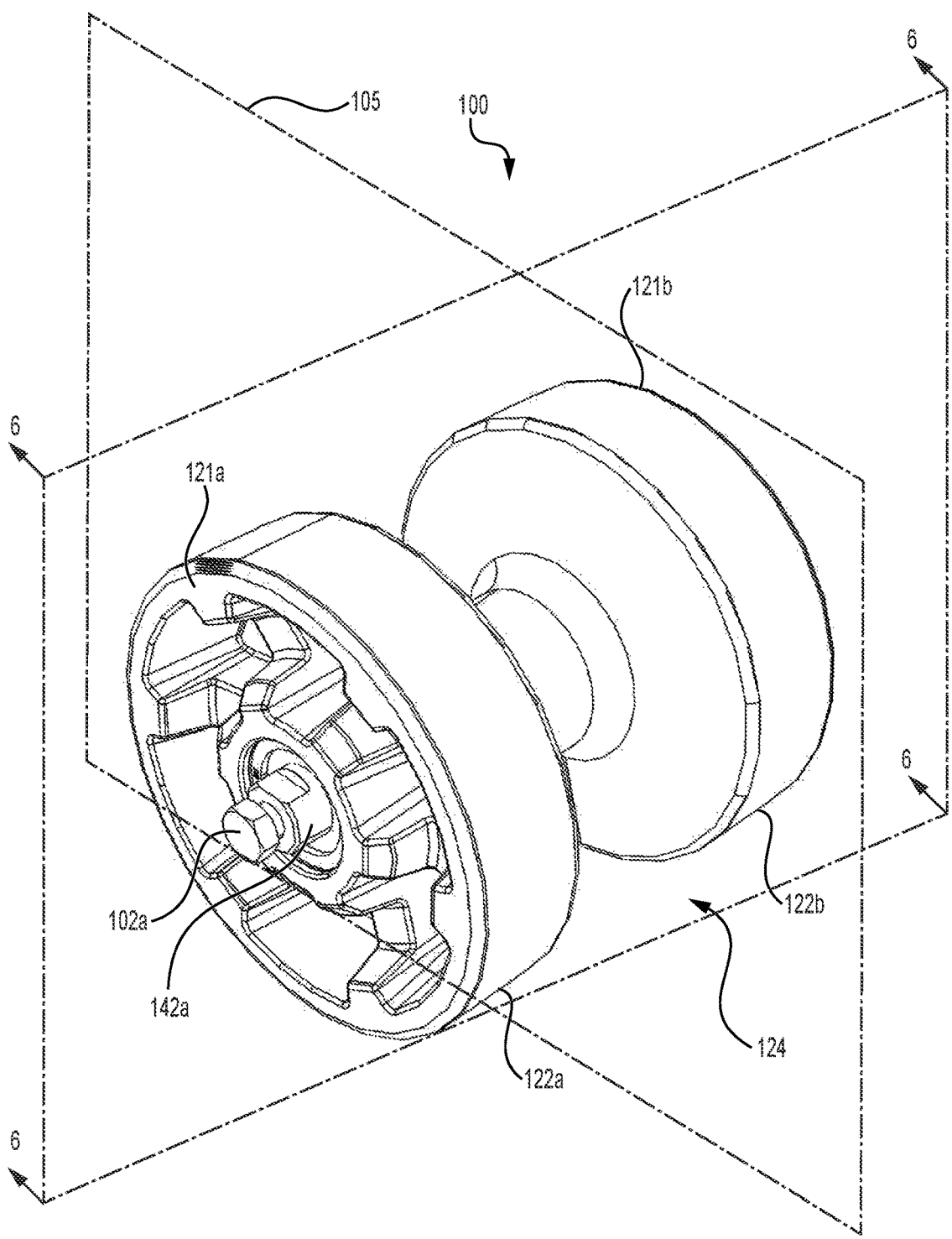
FIG. 5 is a perspective view taken from a top, front, right side of a support wheel assembly of the track system of FIG. 2.
Figure 6:
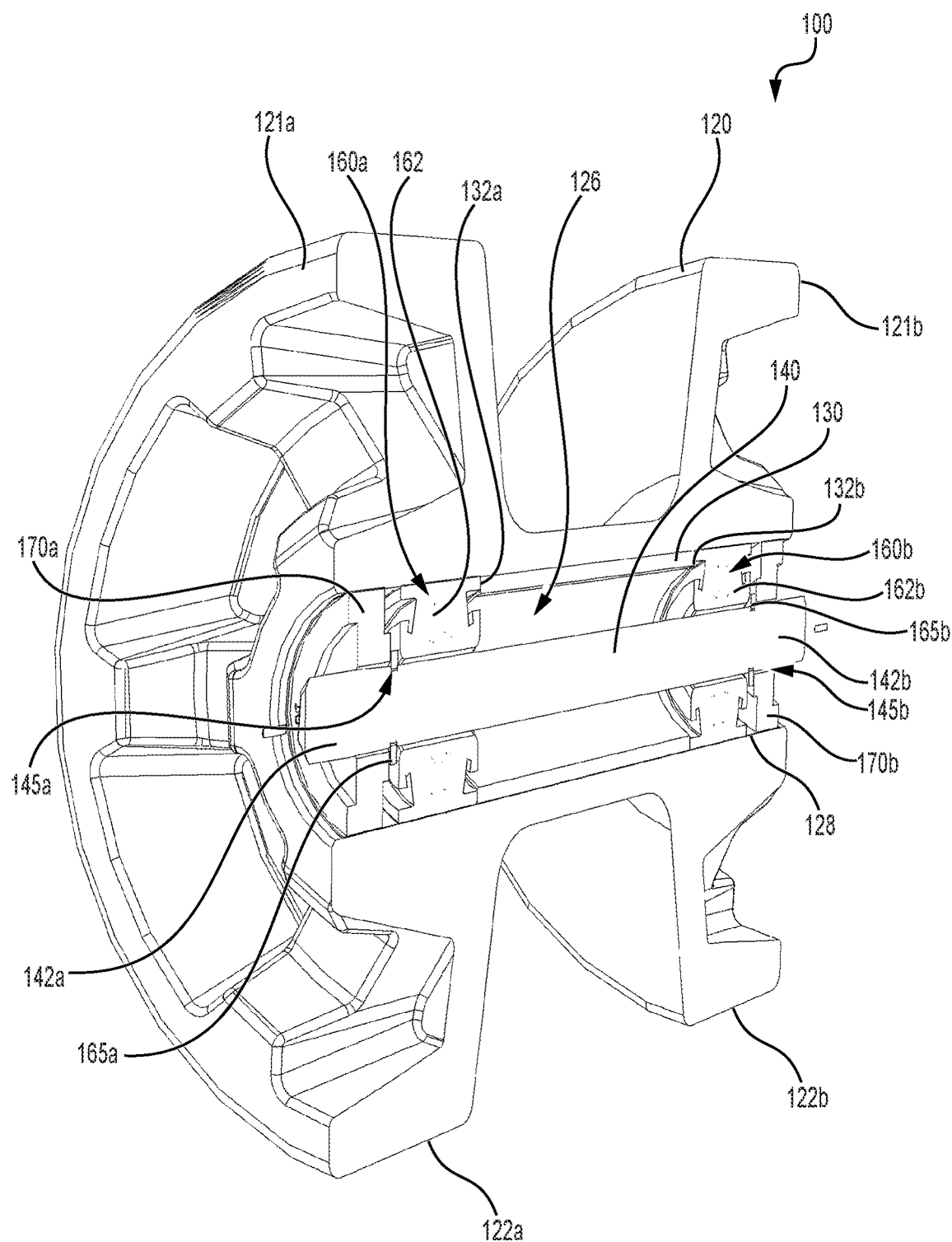
FIG. 6 is a perspective cross-sectional view taken from a top, front, right side of the support wheel assembly of FIG. 5 taken along the plane 6-6 of FIG. 5.

Referring to FIGS. 4 to 6, the front and rear idler wheel assemblies 80, 82 and the support wheel assemblies 100, 101, 102, 103 will now be described. As the front and rear idler wheel assemblies 80, 82 and the support wheel assemblies 100, 101, 102, 103 are generally similar, only the support wheel assembly 100 will be described in detail.

The support wheel assembly 100 includes a wheel 120, an axle 140 and, bearings 160*a*, 160*b* and seals 170*a*, 170*b*. As will become apparent from the description below, the support wheel assembly 100 is not unitary with the frame 62.

The wheel 120, which has a lateral side 121*a* and a lateral side 121*b*, has a track-engaging portion 122*a* proximate to the lateral side 121*a* and a track-engaging portion 122*b* proximate to the lateral side 121*b*. A central portion 124 is defined between the track-engaging portions 122*a*, 122*b*. The central portion 124 is configured to receive the lugs 202 therebetween, without interference. The track engaging portions 122*a*, 122*b* engage the inner surface 210 of the endless track 200. The wheel 120 defines a wheel cavity 126 that extends through an entire width of the wheel 120. It is contemplated that in some embodiments, the wheel cavity 126 could extend along a portion of the width of the wheel 120. Thus, the wheel 120 has an inner wall 128. In the present embodiment, the inner wall 128 is cylindrical. Within the wheel cavity 126, the wheel 120 has a projecting portion 130 that projects radially away the inner wall 128. The projecting portion 130 is centrally disposed within the wheel cavity 126, and has lateral abutting surfaces 132*a*, 132*b*.

The axle 140, which is receivable in the wheel cavity 126, has an axle end portion 142*a* and an axle end portion 142*b*. The axle 140 defines a groove 145*a* extending on a whole circumference of the axle 140 at the axle end portion 142*a*, and a groove 145*b* extending on a whole circumference of the axle 140 at the axle end portion 142*b*. As will be described below, the grooves 145*a*, 145*b* are configured to respectively receive retaining rings 165*a*, 165, therein. In some embodiments, the grooves 145*a*, 145*b* could be omitted. The axle 140 is removably connected to the frame 62. More precisely, as best seen in FIG. 4, the axle end portion 142*a* is connected to the lateral frame portion 66*a* by a fastener 102*a* of the wheel assembly 100, and the axle end portion 142*b* is connected to the lateral frame portion 66*b* by a fastener 102*b* of the wheel assembly 100. The axle 140 is sized to be contained within the frame 62, and extends from the lateral frame portion 66*a* to the lateral frame portion 66*b*. Thus, when the axle 140 is received in the wheel cavity 126, a portion of the axle end portion 142*a* protrudes from the wheel cavity 126 past the lateral side 121*a* (i.e., a portion of the axle end portion 142*a* extends beyond the lateral side 121*a*), and a portion of the axle end portion 142*b* protrudes from the wheel cavity 126 past the lateral side 121*b* (i.e., a portion of the axle end portion 142*b* extends beyond the lateral side 121*b*). The axle 140 is configured such that when the axle 140 is received in the wheel cavity 126, the axle 140 does not contact the inner wall 128 or the projecting portion 130.

The axle 140 is rotationally connected to the wheel 120 by the bearing assemblies 160*a*, 160*b*. The bearing assemblies 160*a*, 160*b* are disposed in the wheel cavity 126. The bearing assembly 160*a* is disposed at the axle end portion 142*a* and abuts the lateral abutting surface 132*a*, and the bearing assembly 160*b* is disposed at the axle end portion 142*b* and abuts the lateral abutting surface 132*b*. As will be described in greater detail below, the bearing assemblies 160*a*, 160*b* abutting the lateral abutting surfaces 132*a*, 132*b* aid in positioning the bearing assemblies 160*a*, 160*b* in the wheel cavity 126. The bearing assemblies 160*a*, 160*b* are connected to the axle 140 by a sliding fit, and are connected to the inner wall 128 by an interference fit. In some embodiments, the bearing assemblies 160*a*, 160*b* could be connected to the axle 120 and/or to the inner wall 128 by clearance fits (i.e., sliding fits), interference fits (i.e., press fit) and/or transition fit (i.e., similar fit). Thus, the wheel 120 is free to rotate relative to the axle 140 due to the bearing assemblies 160*a*, 160*b*. The bearing assemblies 160*a*, 160*b* can sustain relatively high radial loads. In the present embodiment, the bearing assembly 160*a* includes a tapered roller bearing 162*a*, and the bearing assembly 160*b* includes a tapered roller bearing 162*b*. It is contemplated that in some embodiments, other types of bearings could be used such as needle bearings or ball bearings. In some embodiments, the bearing assemblies 160*a*, 160*b* could include unit bearings.

The wheel assembly 100 also includes the retaining rings 165*a*, 165*b*. The retaining ring 165*a* is configured to be received in the groove 145*a*, and the retaining ring 165*b* is configured to be received in the groove 145*b*. The retaining rings 165*a*, 165*b* can, respectively, abut the bearing assemblies 160*a*, 160*b*, such that a laterally inward portion of the retaining ring 165*a* can be in contact with a laterally outward portion of the bearing assembly 160*a*, and a laterally inward portion of the retaining ring 165*b* can be in contact with a laterally outward portion of the bearing assembly 160a. Thus, the retaining rings 165a, 165b can prevent the bearing assemblies 160a, 160b from moving axially along the axle 140. In some embodiments, the retaining rings 165a, 165b could be configured to be received in grooves defined in the inner wall 128. In some embodiments, the retaining rings 165a, 165b could be omitted. It is contemplated that in such embodiments, the bearing assemblies 160a, 160b could be connected to the axle by an interference fit, such that the bearing assemblies 160a, 160b could not move axially.

The wheel assembly 100 also includes the seals 170a, 170b. The seal 170a is disposed in the wheel cavity 126, laterally outwardly to the bearing assembly 160a with reference to a longitudinal wheel assembly center plane 105. The seal 170a has an inward portion that is in contact with a laterally outward portion of the retaining ring 165a. In some embodiments where the retaining ring 165a is omitted, the inward portion of the seal 170a is in contact with a laterally outward portion of the bearing assembly 160a. It is also contemplated that in some embodiments, the inward portion of seal 170a is not in contact with the laterally outward portion of the bearing assembly 160a. The seal 170a has a radial inner surface in contact with axle 140 at the axle end portion 142a and a radial outer surface in contact with the inner wall 128. The seal 170a seals one side of the wheel cavity 126. Similarly, the seal 170b is disposed in the wheel cavity 126, laterally outwardly to the bearing assembly 160b with reference to the longitudinal wheel assembly center plane 105. The seal 170b has an inward portion that is in contact with a laterally outward portion of the retaining ring 165b. In some embodiments, where the retaining ring 165b is omitted, the inward portion of the seal 170b is in contact with a laterally outward portion of the bearing assembly 160b. It is also contemplated that in some embodiments, the inward portion of seal 170b is not in contact with the laterally outward portion of the bearing assembly 160b. The seal 170b has a radial inner surface in contact with axle 140 at the axle end portion 142b and a radial outer surface in contact with the inner wall 128. The seal 170b seals the other side of the wheel cavity 126. The seals 170a, 170b can prevent dust or dirt from getting into the bearing assemblies 160a, 160b, thereby protecting the bearings assemblies 160a, 160b. It is contemplated that in some embodiments, the seals 170a, 170b could be omitted. It is contemplated that in some embodiments, the seal 170a could be integrated to the bearing assembly 160a and the seal 170b could be integrated to the bearing assembly 160b to prevent dust and debris from entering the bearing assemblies 160a, 160b. In some embodiments, the seals 170a, 170b are integrated to the bearing assemblies 160a, 160b such that the bearing assemblies 160a, 160b each have two seals disposed on either side of rolling elements, thereby sealing the bearing assemblies 160a, 160b.

A method of assembling the support wheel assembly 100 and connecting and removing the support wheel assembly 100 to and from the frame 62 will now be described.

First, the support wheel assembly 100 is assembled. The axle 140 is received in the wheel cavity 126. Then, the bearings 160a, 160b are inserted in the wheel cavity 126 until the bearings 160a, 160b respectively abut the lateral abutting surfaces 132a, 132b. Then, the retaining rings 165a, 165b are inserted in the wheel cavity 126 until the retaining rings 165a, 165b are respectively received in the grooves 145a, 145b. Thus, the bearing assemblies 160a, 160b are substantially axially fixed relative to the axle 140. Then, the seals 170a, 170b are inserted in the wheel cavity such that the seals 170a, 170b seal the wheel cavity 126. It is understood that the order of the assembly could change.

The support wheel assembly 100 is then disposed within the frame 62, between the lateral frame portions 66a, 66b.

The support wheel assembly 100 is then connected to the frame 62. More precisely, the fastener 102a is received through an aperture (not shown) defined on the lateral frame portion 66a of the frame 62, and is fastened to the axle end portion 142a. Similarly, the fastener 102b is received through an aperture (not shown) defined on the lateral frame portion 66b of the frame 62, and is fastened to the axle end portion 142b, thereby fixing the axle 140 to the frame 62.

To remove the support wheel assembly 100 from the frame 62, the fasteners 102a, 102b are unfastened, thereby allowing quick removal of the support wheel assembly 100.

Now describing the present technology in operation, when the sprocket wheel assembly 70 rotates, driven by the driving axle, the sprocket wheel assembly 70 engages with the lugs 202 to drive the endless track 200, and thus the track system 60a. When the endless track 200 is driven, the front and rear idler wheel assemblies 80, 82 and the support wheel assemblies 100, 101, 102, 103, which engage the inner surface 210 of the endless track 200, rotate. As the axle 140 of the front and rear idler wheel assemblies 80, 82 and the support wheel assemblies 100, 101, 102, 103 are fixed to the frame 62, the wheels 120 of the front and rear idler wheel assemblies 80, 82 and the support wheel assemblies 100, 101, 102, 103 rotate relative to their respective axles 140.

The bearing assemblies 160a, 160b, by reducing friction between moving parts (i.e., between wheel 120 and axle 140), also reduce the level of noise, the level of vibration and the level of heat that are generated. This, in turn, can enhance ride quality of the compact track loader 50 and can enable the compact track loader 50 to be operated at higher top speeds.

As previously mentioned, the presence of laterally reinforcing members in conventional track systems can pose a limit to the operational top speed of its vehicle. According to the present technology, however, as the endless track 200 is made from an elastomeric material free of lateral reinforcing members, the endless track 200 is less likely to vibrate at higher speeds. Thus, the endless track 200 can also enhance ride quality and enable the compact track loader 50 to be operated at higher speeds.

Thus, the present technology can enable the compact track loader 50 to reach higher top speeds while maintaining and/or improving ride quality and durability of the track systems 60a, 60b. In some embodiments, the present technology could improve a top speed of the compact track loader 50 by a factor of 2, 1.8, or 1.5.

The various components of the track systems 60a, 60b are made of conventional materials (e.g., metals and metal alloys in most cases, such as steel) via conventional manufacturing processes (e.g., casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present technology may become apparent to those skilled in the art. The foregoing description is intended to be exemplary rather than limiting.

What is claimed is:

1. A wheel assembly for a track system of a light heavy-duty vehicle, the track system comprising a frame and an elastomeric endless track, and the wheel assembly comprising:
a wheel defining a wheel cavity, the wheel having a first side and a second side opposite to the first side;
an axle receivable in the wheel cavity, the axle having a first end portion and a second end portion; wherein a portion of the first end portion of the axle extends from the first side of the wheel and a portion of the second end portion of the axle extends from the second side of the wheel;
a first bearing assembly and a second bearing assembly, the first and second bearing assemblies configured to rotationally connect the axle to the wheel, the first bearing assembly being disposed in the wheel cavity proximate to the first end portion of the axle; and the second bearing assembly being disposed in the wheel cavity proximate to the second end portion of the axle; and the wheel assembly being removably connectable to the frame of the track system.

2. The wheel assembly of claim 1, further comprising:
a first seal disposed in the wheel cavity, outwardly to the first bearing assembly and ir contact with the wheel and the axle, the first seal being configured to seal one side of the wheel cavity; and
a second seal disposed in the wheel cavity, outwardly to the second bearing assembly and in contact with the wheel and the axle, the second seal being configured to seal another side of the wheel cavity.

3. The wheel assembly of claim 1, wherein the first bearing assembly includes a first seal integrated to the first bearing assembly and the second bearing assembly includes a second seal integrated to the second bearing assembly.

4. The wheel assembly of claim 1, further comprising a first fastener connectable to the first end portion of the axle and a second fastener connectable to the second end portion of the axle, the first and second fasteners removably connecting the wheel assembly to the frame of the track system.

5. The wheel assembly of claim 1, further comprising a first retaining ring connected to the axle proximate to the first end portion, and a second retaining ring connected to the axle proximate to the second end portion.

6. The wheel assembly of claim 1, wherein each of the first and second bearing assemblies includes a tapered roller bearing.

7. The wheel assembly of claim 1, wherein the wheel has a first track-engaging portion, a second track-engaging portion, and a central portion defined between the first and second track engaging portions.

8. The wheel assembly of claim 1, wherein the wheel assembly is at least one of a support wheel assembly and an idler wheel assembly.

9. A track system operatively connectable to a light heavy-duty vehicle, the track system comprising:
a frame;
a sprocket wheel assembly rotationally connected to the frame;
at least one idler wheel assembly rotationally connected to the frame;
at least one support wheel assembly removably connected to the frame, the at least one support wheel assembly comprising:
a wheel defining a wheel cavity, the wheel having a first side and a second side opposite to the first side;
an axle receivable in the wheel cavity, the axle having a first end portion and a second end portion; wherein a portion of the first end portion of the axle extends from the first side of the wheel and a portion of the second end portion of the axle extends from the second side of the wheel;
a first bearing assembly and a second bearing assembly, the first and second bearing assemblies configured to rotationally connect the axle to the wheel, the first bearing assembly being disposed in the wheel cavity proximate to the first end portion of the axle; and the second bearing assembly being disposed in the wheel cavity proximate to the second end portion of the axle, and
an elastomeric endless track surrounding the frame, the sprocket wheel assembly, the at least one idler wheel assembly, and the at least one support wheel assembly.

10. The track system of claim 9, wherein the at least one support wheel assembly further comprises:
a first seal disposed in the wheel cavity, outwardly to the first bearing assembly and in contact with the wheel and the axle, the first seal configured to seal one side of the wheel cavity; and
a second seal disposed in the wheel cavity, outwardly to the second bearing assembly and in contact with the wheel and the axle, the second seal configured to seal another side of the wheel cavity.

11. The track system of claim 9, wherein the first bearing assembly includes a first seal integrated to the first bearing assembly and the second bearing assembly includes a second seal integrated to the second bearing assembly.

12. The track system of claim 9, wherein the at least one support wheel assembly further comprises a first fastener connectable to the first end portion of the axle and a second fastener connectable to the second end portion of the axle, the first and second fasteners removably connecting the wheel assembly to the frame of the track system.

13. The track system of claim 9, further comprising a first retaining ring connected to the axle proximate to the first end portion, and a second retaining ring connected to the axle proximate to the second end portion.

14. The track system of claim 9, wherein the elastomeric track is laterally deformable.

15. The track system of claim 14, wherein the elastomeric track is longitudinally reinforced, and non-reinforced laterally.

16. The track system of claim 9, wherein the at least one idler wheel assembly comprises:
a wheel defining a wheel cavity;
an axle receivable in the wheel cavity, the axle having a first end portion and a second end portion;
a first bearing assembly and a second bearing assembly, the first and second bearing assemblies configured to rotationally connect the axle to the wheel, the first bearing assembly being disposed in the wheel cavity proximate to the first end portion of the axle, the second bearing assembly being disposed in the wheel cavity proximate to the second end portion of the axle.

17. A light heavy-duty vehicle comprising:
at least two axles;
at least two track systems, each one of the at least two track systems being operatively connected to one of the at least two axles, and each of the at least two track systems comprising:
a frame;
a sprocket wheel assembly rotationally connected to the frame;

at least one idler wheel assembly rotationally connected to the frame;

at least one support wheel assembly removably connected to the frame, the at least one support wheel assembly having:

a wheel defining a wheel cavity, the wheel having a first side and a second side opposite to the first side;

an axle receivable in the wheel cavity, the axle having a first end portion and a second end portion; wherein a portion of the first end portion of the axle extends from the first side of the wheel and a portion of the second end portion of the axle extends from the second side of the wheel;

a first bearing assembly and a second bearing assembly, the first and second bearing assemblies configured to rotationally connect the axle to the wheel, the first bearing assembly being disposed in the wheel cavity proximate to the first end portion of the axle, the second bearing assembly being disposed in the wheel cavity proximate to the second end portion of the axle; an elastomeric endless track surrounding the frame, the sprocket wheel assembly, the idler wheel assembly and the at least one support wheel assembly.

18. The light heavy-duty vehicle of claim 17, wherein the light heavy-duty vehicle is a compact track loader or a tracked skid-steer.

\* \* \* \* \*